(12) United States Patent
Patel et al.

(10) Patent No.: US 10,341,485 B1
(45) Date of Patent: Jul. 2, 2019

(54) CALLER IDENTITY AND AUTHENTICATION SERVICE

(71) Applicant: FMR LLC, Boston, MA (US)

(72) Inventors: Rinkesh Patel, Flower Mound, TX (US); Thomas McGuire, Claregalway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/981,875

(22) Filed: May 16, 2018

(51) Int. Cl.
| | |
|---|---|
| *H04M 3/42* | (2006.01) |
| *H04L 29/06* | (2006.01) |
| *H04L 9/32* | (2006.01) |
| *H04W 12/04* | (2009.01) |
| *H04W 12/06* | (2009.01) |

(52) U.S. Cl.
CPC ...... *H04M 3/42042* (2013.01); *H04L 9/3213* (2013.01); *H04L 63/083* (2013.01); *H04L 65/1003* (2013.01); *H04L 65/1076* (2013.01); *H04M 3/42059* (2013.01); *H04W 12/04* (2013.01); *H04W 12/06* (2013.01)

(58) Field of Classification Search
CPC .......... H04M 3/42042; H04M 3/42059; H04L 65/1003; H04L 65/1076; H04L 63/083; H04L 9/3213; H04W 12/06; H04W 12/04
See application file for complete search history.

(56) References Cited

U.S. PATENT DOCUMENTS

| | | | |
|---|---|---|---|
| 2008/0159501 | A1 | 7/2008 | Cai |
| 2008/0181379 | A1 | 7/2008 | Chow et al. |
| 2011/0261937 | A1 | 10/2011 | Chmara et al. |
| 2014/0250512 | A1 | 9/2014 | Goldstone et al. |

OTHER PUBLICATIONS

Barger, Art, "Using Automated Caller Authentication to Transform the Customer Experience," TRUSITD, Posted Mar. 13, 2013, https://www.trustid.com/archives/using-automated-caller-authentication-to-transform-the-customer-experience-242/, last visited May 30, 2018.
Contactive, "Contactive—Free Caller ID 3.3.0," Contactive, released Sep. 8, 2015, https://contactive-free-caller-id.soft112.com/, last visited May 30, 2018.
Gogolook Co., Ltd., "whoscall card," Gogolook Co., Ltd., 2016, https://card.whoscall.com/en-US/, last visited May 30, 2018.

(Continued)

*Primary Examiner* — Marcus Hammonds
(74) *Attorney, Agent, or Firm* — Proskauer Rose LLP

(57) ABSTRACT

A computer-implemented method is described for authenticating the identity of a caller. A mobile computing device receives, via a wireless communications network, an incoming call setup request initiated by a phone system of a caller, and executes an identity service application upon receipt of the incoming call setup request. The call includes a plurality of data packets. The mobile computing device extracts a caller identifier from the plurality of data packets. The caller identifier includes one or more bits at a first predetermined position within the plurality of data packets. The mobile computing device forwards the caller identifier to an identity service computing device. The identity service computing device determines an identity status of the caller. The mobile computing device receives, from the identity service computing device, an authentication token and the identity status of the caller. The mobile computing device displays the identity status of the caller.

15 Claims, 4 Drawing Sheets

(56) References Cited

OTHER PUBLICATIONS

Reinhold et al., "Challenge—response authentication," Wikipedia, https://en.wikipedia.org/wiki/Challenge%E2%80%93response_authentication, last edited Feb. 12, 2018.
TRUSTID, "How It Works," TRUSTID, 2017, https://www.trustid.com/how-it-works/, last visited May 30, 2018.

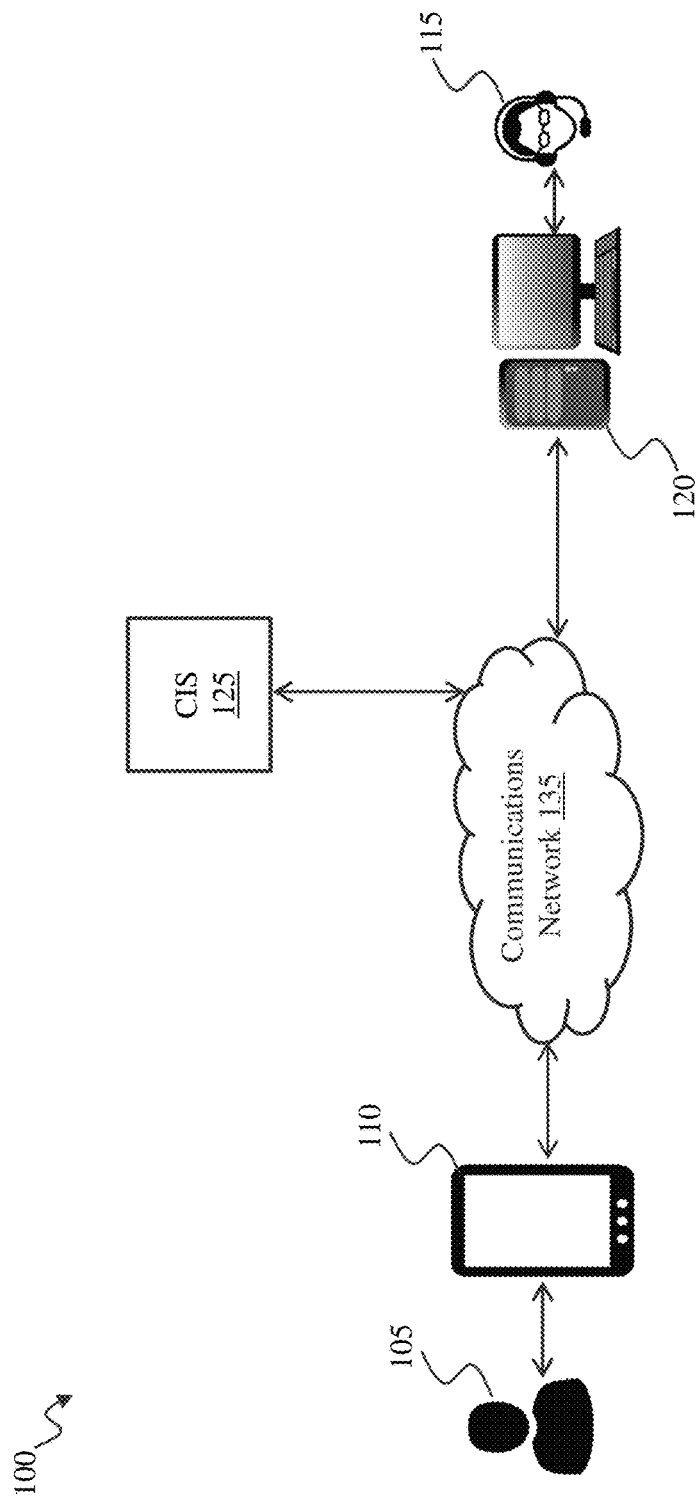

200

205 Receiving, via a wireless communications network, an incoming call setup request initiated by a phone system of a caller 210 Executing an identity service application upon receipt of the incoming call setup request, the call comprising a plurality of data packets, wherein the identity service application is configured to cause the mobile computing device to:

215 Extract a caller identifier from the plurality of data packets, the caller identifier comprising one or more bits at a first predetermined position within the plurality of data packets 220 Forward the caller identifier to an identity service computing device via a data communications network, the identity service computing device configured to determine an identity status of the caller 225 Receive, from the identity service computing device, via the data communications network, an authentication token and the identity status of the caller 230 Display, on a display device of the mobile computing device, the identity status of the caller

305 Establishing a first call in response to an incoming call setup request initiated by a phone system of a caller, the caller being registered with an identity service 310 Extracting caller identifier data from a signal of the first call, the caller identifier data corresponding to a phone number of the caller 315 Initiating a second call to the identity service 320 Providing the caller identifier data to an identity service computing device of the identity service 325 Receiving via the second call, one or more dual-tone multi-frequency signaling tones indicating an identity status of the caller

405 Establishing a first call in response to an incoming call setup request initiated by a phone system of a caller registered with an identity service, wherein the phone system of the caller contemporaneously provides caller identifier data corresponding to the phone terminal to an identity service computing device of the identity service via a second call established by the phone system of the caller 410 Initiating a third call to the identity service 415 receiving via the third call, one or more dual-tone multi-frequency signaling tones indicating an identity status of the caller

FIG. 4

CALLER IDENTITY AND AUTHENTICATION SERVICE

TECHNICAL FIELD

This application relates generally to systems and methods employed in authenticating the identity of a calling party. In particular, this application relates to a caller identity service and methods for authenticating a caller through interactions with caller identity services.

BACKGROUND

Over the past several years, the number and variety of fraudulent calls has steadily increased. Fraudulent callers impersonate government officials, insurance agents, etc. to attempt to scam people into transferring money to them or to trick people into providing personal/financial information (e.g., IRS Frauds). Scammers often target people of certain age groups that may be inexperienced or unsophisticated with technology and thus easily confused. In many cases a fraudulent callers' requests seem legitimate and their stories credible because they have obtained some basic information about the call recipient that can be recited during the conversation in an official-sounding manner, often deceiving the call recipient to provide additional personal information when queried.

Currently, voice and data communications service providers do not provide a process for reliably establishing the identity of calling parties. Further, existing techniques for authenticating the identity of a caller rely on inadequate and unsecure information extracted from a limited number of data fields in a communications connection.

SUMMARY

There is therefore a need for systems and methods for authenticating the identity of a calling party, and methods that simplify the authentication process yet enhance the robustness of the authentication process through interactions with a caller identity service.

In one aspect, the technology features a computer-implemented method for authenticating the identity of a caller. A mobile computing device receives, via a wireless communications network, an incoming call setup request initiated by a phone system of a caller. The mobile computing device executes an identity service application upon receipt of the incoming call setup request. The call includes a plurality of data packets. The identity service application is configured to cause the mobile computing device to extract a caller identifier from the plurality of data packets. The caller identifier includes one or more bits at a first predetermined position within the plurality of data packets. The identity service application is configured to cause the mobile computing device to forward the caller identifier to an identity service computing device via a data communications network The identity service computing device is configured to determine an identity status of the caller. The identity service application is configured to cause the mobile computing device to receive, from the identity service computing device, via the data communications network, an authentication token and the identity status of the caller. The identity service application is configured to cause the mobile computing device to display, on a display device of the mobile computing device, the identity status of the caller.

The above aspects can include one or more of the following features. In some embodiments, the identity service application is further configured to cause the mobile computing device to (i) substitute one or more bits at a second predetermined position within the plurality of data packets of the call with the authentication token upon acceptance of the incoming call setup request by a user of the mobile computing device, (ii) display, on the display device of the mobile computing device a first key generated based on the authentication token, where the first key comprising a plurality of alphanumeric characters, and (iii) prompt the user of the mobile computing device to request the caller to verify a second key displayed on a display device of the phone system of the caller The second key is generated based on the authentication token extracted by the phone system of the caller from the second predetermined position within the plurality of data packets of the call.

In some embodiments, the identity service application is further configured to cause the mobile computing device to (i) transmit, to the phone system of the caller, a request to execute an identity verification function, where the request includes the authentication token, (ii) receive, from the phone system of the caller, a result token generated by the phone system of the caller based on the authentication token, and (iii) validate the result token against a key generated based on the authentication token.

In some embodiments, the call is conducted using the Session Initiation Protocol signaling protocol. In some embodiments, the identity verification function is a method for extending the Session Initiation Protocol.

In some embodiments, the identity service computing device determines the identity status of the caller based on one or more of (i) a subscription of the caller to an identity service associated with the identity service computing device, and (ii) public data associated with the caller comprising a caller name, at least one statistic indicating a verification status of the caller, and a public sentiment rating. In some embodiments, the public sentiment rating is based on a plurality of votes by users who have received an incoming call from the caller.

In some embodiments, the wireless communications network is one of a GSM, CDMA, TDMA, iDEN, or AMPS network. In some embodiments, the data communications network is a different network than the wireless communications network.

In some embodiments, a client computing device of the caller contemporaneously initiates communication with the identity service computing device upon initiating the incoming call setup request.

In some embodiments, the identity service application is further configured to cause the mobile computing device to (i) substitute one or more bits at a second predetermined position within the plurality of data packets of the call with the authentication token upon acceptance of the incoming call setup request by a user of the mobile computing device, (ii) display, on the display device of the mobile computing device a first key generated based on the authentication token, where the first key includes a plurality of alphanumeric characters, and (iii) prompt the user of the mobile computing device to request the caller to verify a second key displayed on a display device of the phone system of a caller, where the second key is generated based on the authentication token extracted by the phone system of the caller from the second predetermined position within the plurality of data packets of the call.

In some embodiments, the identity service application is further configured to cause the mobile computing device to (i) display, on the display device of the mobile computing device, a first key generated based on the authentication token upon acceptance of the incoming call setup request by a user of the mobile computing device, where the first key includes a plurality of alphanumeric characters, and (ii) prompt the user of the mobile computing device to request the caller to verify a second key displayed on a display device of the client computing device of the caller. The second key is generated based on the authentication token sent to the client computing device of the caller from the identity service computing device.

In some embodiments, the identity service computing device determines the identity status of the caller based on one or more of (i) a subscription of the caller to an identity service associated with the identity service computing device, and (ii) public data associated with the caller comprising a caller name, at least one statistic indicating a verification status of the caller, and a public sentiment rating. In some embodiments, the public sentiment rating is based on a plurality of votes by users who have received an incoming call from the caller.

In some embodiments, the wireless communications network is one of a GSM, CDMA, TDMA, iDEN, or AMPS network. In some embodiments, the data communications network is a different network than the wireless communications network.

In another aspect, the technology features a computerized method for authenticating the identity of a caller. A phone terminal establishes a first call in response to an incoming call setup request initiated by a phone system of a caller. The caller is registered with an identity service. The phone terminal extracts caller identifier data from a signal of the first call, where the caller identifier data corresponding to a phone number of the caller. The phone terminal initiates a second call to the identity service. The phone terminal provides the caller identifier data to an identity service computing device of the identity service. The phone terminal receives, via the second call, one or more dual-tone multi-frequency signaling tones indicating an identity status of the caller.

The above aspects can include one or more of the following features. In some embodiments, the phone terminal initiates a hook flash event upon extracting the caller identifier data. In some embodiments, the phone terminal is a dual-tone multi-frequency signaling (DTMF) phone terminal. In some embodiments, the one or more dual-tone multi-frequency signaling tones includes a first set of tones indicating the caller is registered with the identity service or a second set of tones indicating the identity of the caller is unverified.

In another aspect, the technology features a computerized method for authenticating the identity of a caller. A phone terminal establishes a first call in response to an incoming call setup request initiated by a phone system of a caller registered with an identity service. The phone system of the caller contemporaneously provides caller identifier data corresponding to the phone terminal to an identity service computing device of the identity service via a second call established by the phone system of the caller. The phone terminal initiates a third call to the identity service. The phone terminal receives, via the third call, one or more dual-tone multi-frequency signaling tones indicating an identity status of the caller.

The above aspects can include one or more of the following features. In some embodiments, the phone terminal initiates a hook flash event upon establishing the first call. In some embodiments, the phone terminal is a dual-tone multi-frequency signaling (DTMF) phone terminal. In some embodiments, the one or more dual-tone multi-frequency signaling tones includes a first set of tones indicating the caller is registered with the identity service or a second set of tones indicating the identity of the caller is unverified.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

FIG. 1 is a block diagram of a computing environment for a caller identity and authentication service according to embodiments of the technology described herein.

FIG. 2 is a flow diagram of a method for authenticating the identity of a caller using a caller identity and authentication service according to embodiments of the technology described herein.

FIG. 3 is a flow diagram of a method for authenticating the identity of a caller using a caller identity and authentication service according to embodiments of the technology described herein.

FIG. 4 is a flow diagram of a method for authenticating the identity of a caller using a caller identity and authentication service according to embodiments of the technology described herein.

DETAILED DESCRIPTION

The described systems and methods for authenticating the identity of a caller utilize interactions with a subscription-based caller identity service, along with a newly-developed extension to a communications protocol to provide advantages over existing authentication schemes.

FIG. 1 is a block diagram of an exemplary computing environment 100 for a caller identity and authentication service. Computing environment 100 includes call recipient 105 (hereinafter "recipient 105"), recipient mobile computing device 110 (hereinafter "recipient device 110"), caller 115, caller phone system 120, caller identity service 125 (hereinafter "CIS 125"), and communications network 135.

Recipient 105 is a user in possession of recipient device 110 that can receive a call. Recipient device 110 is depicted as a smartphone in FIG. 1. However, it should be understood that recipient device 110 can be many different devices capable of receiving a call. Examples of recipient device 110 include tablet computers, smartphones, and other mobile computing devices known in the art. In some embodiments, recipient device 110 is a laptop or desktop computer equipped with hardware and software for making phone calls using Voice over Internet Protocol ("VoIP"). Other examples of recipient device 110 are described below in connection with embodiments of the technology.

In some embodiments, recipient device 110 includes network-interface components to enable connectivity to communications network 135 via multiple mediums and network types. For example, the network-interface components can include components to connect to either of a wired network or a wireless network, such as a Wi-Fi or cellular network, in order to access a wider network, such as the Internet. In some embodiments, recipient device 110 can make and receive phone calls over a first network type while an application executing on recipient device 110 communicates over a second network type. In some embodiments, recipient device 110 conducts phone calls over the same network upon which an application executing on recipient device 110 is communicating.

Caller 115 is a second user, typically a service or sales representative employed by a business or services enterprise. Caller 115 can initiate an interaction with recipient 105 via a phone call from caller phone system 120 to recipient device 110. Caller phone system 120 is depicted as a desktop computer in FIG. 1. However, it should be understood that caller phone system 120 can be many different devices capable of initiating a call. Examples of caller phone system 120 include tablet computers, smartphones, and other mobile computing devices known in the art. In some embodiments, caller phone system 120 is a laptop or desktop computer equipped with hardware and software for making phone calls using VoIP. In some embodiments, caller phone system 120 includes two or more devices that are operated in tandem to perform the methods and processes described herein. Other examples of caller phone system 120 are described below in connection with embodiments of the technology.

In some embodiments, caller phone system 120 includes network-interface components to enable connectivity to communications network 135 via multiple mediums and network types. For example, the network-interface components can include components to connect to either of a wired network or a wireless network, such as a Wi-Fi or cellular network, in order to access a wider network, such as the Internet. In some embodiments, caller phone system 120 can make and receive phone calls over a first network type while an application executing on caller phone system 120 communicates over a second network type. In some embodiments, caller phone system 120 conducts phone calls over the same network upon which an application executing on caller phone system 120 is communicating.

CIS 125 is a service for administering an authentication process or "trust handshake" process between a calling party (e.g., caller 115) and a call recipient (e.g., recipient 105). As described in more detail below, the steps to carry out the trust handshake process can vary depending on the capabilities of the phones and/or computing devices used by the calling party and call recipient. However, in general, the trust handshake process administered by CIS 125 utilizes hardware and software computing technology in tandem to authenticate the identity of a calling party and provide the call recipient with an identity status or indication of whether the calling party's identity has been verified.

CIS 125 can include a diverse IT infrastructure integrating a combination of hardware and software to provide its authentication services. In some embodiments, CIS 125 can host a website or provide access to an application that is used to carry out the caller authentication process. In some embodiments, CIS 125 includes a plurality of server computing devices and databases, and supports connections to a variety of communications media types and protocols. In some embodiments, CIS 125 is part of, or associated with, an organization (e.g., online retailer, educational institution, financial institution, SAAS-provider).

In some embodiments, CIS 125 is operated by a third party separate from recipient 105 and the business or services enterprise employing caller 115. For example, CIS 125 can be a subscription service to which both business entities employing one or more callers and individual call recipients can subscribe for the purpose of facilitating the authentication of the identity of a calling party.

For a business or services enterprise, obtaining a subscription to CIS 125 can include a registration process by which certain information about the business or services enterprise and its infrastructure are provided to CIS 125 and compiled into an identity profile for use during the authentication process. For example, the identity profile associate with a company name can include a roster of calling agents (including, e.g., caller 115) that initiate calls on behalf of the company. In some embodiments, a company's identity profile includes information about the geographic location of the company's facilities and/or the geographic location from which each calling agent places calls.

In some embodiments, an identity profile can include information about the company's information technology infrastructure such as information about caller phone system 120. For example, a company's identity profile can include one or more telephone numbers, MAC addresses, IP addresses, web domains, or email addresses owned by, or associated with, the company. In some embodiments, a company's identity profile associates each of its calling agents with one or more telephone numbers, network addresses (e.g., MAC addresses, IP addresses), web domains, or email addresses utilized by the calling agent. In one example, the identity profile entry for a calling agent (e.g., caller 115) includes the calling agent's name and employee ID, one or more email addresses associated with the agent, the geographic location from which the agent places calls, the telephone number(s) of one or more telephones or call-enabled computing devices from which the agent places calls, and the network addresses of any computing devices used by the agent for placing calls and communicating with CIS 125 according to the authentication processes described herein.

In some embodiments, the identity profile entry for a calling agent includes one or more of the following: the ID of an RFID security tag associated with the calling agent, a photo depicting the calling agent, an ID associated with the company that employs the calling agent, and a logo associated with the company that employs the calling agent. In some embodiments, the company ID is generated and/or assigned by CIS 125. In some examples, the identity profile entry for a calling agent includes one or more blockchain addresses and one or more public keys specific to the calling agent. In some embodiments, the one or more blockchain addresses and one or more public keys are assigned by a central authority (e.g., bank, financial institution, state agency, etc.).

In some embodiments, a company's identity profile incorporates information about the company that CIS 125 obtains via interactions with network infrastructure components associated with one or more mobile carriers. In some embodiments, the identity profile for a company incorporates information about the company that CIS 125 obtains from publicly-accessible websites and databases. For example, CIS 125 can obtain information about a company from an online directory or "yellow pages" website. In some examples, CIS 125 obtains information about a company from government registries (e.g., secretary of state database, SEC/EDGAR search tools, etc.) or from a website hosted by, or associated with, the company. For example, CIS 125 can use these resources to identify and/or verify additional information about the company such as company ID, geographic location of the company's facilities/call centers, and information about the directors and executives of the company. In some embodiments, the identity profile includes a sentiment rating that CIS 125 determines based on analysis of information from websites that publish reviews about interactions with calling agents of companies, or from social media technologies. By obtaining information from such sources, CIS 125 can supplement the information stored in the identity profiles it maintains for its registered companies. Further, information from such sources enables CIS 125 to generate at least partial identity profiles for unregistered companies, thus providing registered call recipients with at least some basis for substantiating the identity of a caller from an unregistered company.

It should be appreciated that the resources described above can also be used to gather and verify information and sentiment data about individual call recipients that have a subscription to CIS 125, and individuals call recipients that do not.

In some embodiments, the process for registering a company with CIS 125 includes a pre-registration screening process by which officials from CIS 125 observe and evaluate the telemarketing and telecommunication practices of the company to ensure that its calling agents do not engage in deceptive or abusive conduct.

For an individual (e.g., recipient 105), obtaining a subscription to CIS 125 can also include a registration process by which certain information about the individual and any telephone or computing devices (e.g., recipient device 110) used by the individual during the authentication process are provided to CIS 125. The information provided by the individual can be compiled into an identity profile for use during the authentication process. For example, an identity profile can include information such as the individual's name, date of birth, and a photo depicting the individual. In some embodiments, the identity profile includes one or more phone numbers, email addresses, and/or social media handles/accounts associated with the individual. In some examples, the identity profile includes information certifying the individual's association or achievement with an institute of professional accreditation or an educational institution.

Communications network 135 facilitates communications between the various components of environment 100 (e.g., recipient device 110, caller phone system 120, CIS 125). Communications network 135 can be a local network, such as a LAN, or a wide area network ("WAN"), such as the Internet and/or a cellular network. Communications network 135 can further comprise components of both a LAN and a WAN, or any other type of network known in the art.

FIG. 2 shows a flow diagram of a method 200 for authenticating the identity of a caller using a caller identity and authentication service. In the exemplary embodiment shown in FIG. 2, both the caller (e.g., caller 115) and the call recipient (e.g., recipient 105) are subscribers to CIS 125. Further, in this embodiment, the caller phone system (e.g., caller phone system 120) used by caller 115, and the recipient device (e.g., recipient device 110) used by recipient 105 have the ability to both make and receive calls, and to connect to CIS 125 via communications network 135.

In some embodiments, caller phone system 120 and recipient device 110 conduct phone calls over a wireless communications network configured to operate using one or more technologies or standards (e.g., GSM, CDMA, TDMA, iDEN, AMPS). In some embodiments, caller phone system 120 and recipient device 110 communicate with CIS 125 via a data communications network that is different from the wireless communications network. For example, caller phone system 120 and recipient device 110 can each use a Wi-Fi or wired network connection to access a wide area network (e.g., Internet) for communicating with CIS 125. In some embodiments, caller phone system 120 and recipient device 110 conduct phone calls and communicate with CIS 125 via the same network (e.g., wireless communications network or data communications network). For example, either or both of caller phone system 120 and recipient device 110 can utilize a technology such as VoIP for conducting phone calls over IP networks (e.g., Internet). In some embodiments, VoIP call data and sessions are configured and controlled according to the Session Initiation Protocol ("SIP").

According to method 200, a mobile computing device receives (205), via a wireless network, an incoming call setup request initiated by a phone system of a caller. For example, caller 115 can initiate a call to recipient 105, causing caller phone system 120 to generate and forward a call setup request to recipient device 110 over a wireless network. In some embodiments, recipient device 110 receives a SIP INVITE request from caller phone system 120.

The mobile computing device executes (210) an identity service application upon receipt of the incoming call setup request, the call comprising a plurality of data packets. In some embodiments, recipient device 110 is a smartphone or other mobile device, and upon receipt of the call setup request (e.g., SIP INVITE) from caller phone system 120, recipient device 110 executes an identity service application for facilitating interactions between recipient device 110 and CIS 125. For example, the identity service application can be integrated with, or be an extension to, the phone application executing on recipient device 110. In some embodiments, the identity service application is provided to recipient 105 by CIS 125 and is initially used to establish recipient 105's subscription with CIS 125.

The identity service application is configured to cause the mobile computing device to extract (215) a caller identifier from the plurality of data packets, the caller identifier comprising one or more bits at a first predetermined position within the plurality of data packets. Continuing the example in the context of SIP, the SIP INVITE request message received from caller phone system 120 includes a number of predetermined header field names with each header field name followed immediately by a colon and the corresponding field value. The identity service application executing on recipient device 110 uses the header field names to identify the position of the field value(s) to extract to obtain caller identifier information from the SIP INVITE message. In some embodiments, the value of the "From" header field is extracted to determine the identity of caller 115 from the point of view of a server that forwarded the SIP INVITE message to recipient device 110. In some embodiments, a SIP Uniform Resource Identifier ("URI") that can be used to contact caller 115 is extracted from the "Contact" header field of the SIP INVITE message. In some embodiments, the URI includes a telephone number.

The identity service application is configured to cause the mobile computing device to forward (220) the caller identifier to an identity service computing device via a data communications network, and the identity service computing device is configured to determine an identity status of the caller. For example, the identity service application executing on recipient device 110 can forward the caller identifier information it extracted from the SIP message header to CIS 125 to be analyzed against its subscriber list.

The identity service application is configured to cause the mobile computing device to receive (225), from the identity service computing device, via the data communications network, an authentication token and the identity status of the caller. For example, upon verifying that the caller identifier information received from recipient device 110 identifies a registered subscriber of CIS 125, CIS 125 can generate and cryptographically sign an authentication token that contains claims about the identity of caller 115. CIS 125 packages the authentication token and an identity status of caller 115 into a SIP setup message and forwards it to recipient device 110. In some embodiments, the identity status of caller 115 is a string or numeric field indicating a status such as "verified," "secure," or "known subscriber." In some embodiments, the identity status includes textual information about caller 115 that CIS 125 obtains from an identity profile for caller 115 or its associated business entity. In some embodiments, the identity status can be based in part on public data associated with caller 115 comprising a caller name, at least one statistic indicating a verification status of caller 115, and a public sentiment rating. In some embodiments, the public sentiment rating is based on a plurality of votes by users who have received an incoming call from caller 115 in the past. In some examples, CIS 125 provides an interface (e.g., website, application, call center, etc.) enabling recipient 105 to provide a rating of a conversation, agent, or company after a call has been completed. In some examples, CIS 125 provides an interface enabling caller 115 to provide a rating of a conversation or individual after a call has been completed. CIS 125 can use the ratings provided by callers and call recipients to update and/or supplement its stored identity profiles. In some embodiments, the ratings include comments entered by the reviewer, and CIS 125 updates its identity profiles based on sentiment analysis conducted on the review comments.

The identity service application is configured to cause the mobile computing device to display (230), on a display device of the mobile computing device, the identity status of the caller. Upon receipt of the message containing the authentication token and an identity status of caller 115, and upon verification of the authentication token, the identity service application executing on recipient device 110 can display the identity status of caller 115 on the display of recipient device 110. In some embodiments, recipient device 110 displays a message or graphic (e.g., green check mark, thumbs-up, closed padlock, etc.) indicative of the identity status of caller 115.

Based on the identity status displayed on recipient device 110, recipient 105 can decide to pick up or to ignore the call from caller 115. In some embodiments, upon verifying that the caller identifier information received from recipient device 110 identifies a registered subscriber, CIS 125 also forwards the authentication token it generates to caller phone system 120 for use throughout the accepted phone conversation to authenticate each communication or message.

In a variation of the scenario described above, recipient 105 is a registered subscriber of CIS 125 as is the business entity that employs caller 115. However, caller 115 may be working at a location remote from the business entity, or may not have an entry in the identity profile for the business entity, and authentication via method 200 would therefore be unsuccessful.

Accordingly, the technology described herein includes a method for authenticating the identity of caller 115 when caller 115 has only an indirect relation with CIS 125 by virtue of caller 115's related business entity's subscribership to CIS 125. For example, encrypted token handling and verification services can be provided via an extension to SIP that executes between SIP-compliant endpoint devices, recipient device 110 and caller phone system 120 of caller 115.

In this extension to method 200, during call or session setup, recipient device 110 receives an authentication token from CIS 125 and an indication that the business entity is a registered subscriber of CIS 125, but caller 115 is not. The identity service application can be configured to cause the mobile computing device (e.g., recipient device 110) to substitute one or more bits at a second predetermined position within the plurality of data packets of the call with the authentication token upon acceptance of the incoming call setup request by a user of the mobile computing device. For example, recipient device 110 sends a SIP INVITE request to authentication token, advertising a SIP extension in the form of an additional supported method in the Allow field. In an exemplary embodiment, recipient device 110 can advertise the method "HANDSHAKE" in its INVITE request to caller phone system 120. An exemplary SIP INVITE message advertising the HANDSHAKE method is shown below.

INVITE from Recipient Device 110 to Caller Phone System 120
   INVITE sip:rpatel@ciservice.com SIP/2.0
   Via: SIP/2.0/UDP serv33.misservice.com;
   To: <sip:caller@corporate.com>
   From: <sip:receiver ciservice.com>; tag=120150912
   Call-ID:a84b4c76e66710@serv33.ciservice.com
   Allow: INVITE, OPTIONS, BYE, CANCEL, ACK, REFER,
   NOTIFY, INFO, HANDSHAKE
   CSeq: 1 INVITE
   Contact: <sip:receiver ciservice.com>
   Content-Type: application/sdp
   Content-Length: 0

Upon receipt of the SIP INVITE, caller phone system 120 can send back a response (e.g. 200 OK) acknowledging the SIP INVITE and advertising that it too supports the HANDSHAKE method. An exemplary SIP 200 OK message advertising support of the HANDSHAKE method back to recipient device 110 is shown below.

200 OK Message from Caller Phone System 120 to Recipient Device 110
   SIP/2.0 200 OK
   To: <sip:receiver ciservice.com>
   From:<sip:caller@corporate.com>; tag=158196d8
   Via: SIP/2.0/UDP serv33.ciservice.com;
   Call-ID:a84b4c76e66710@serv33.ciservice.com
   Allow: INVITE, OPTIONS, BYE, CANCEL, ACK, REFER,
   NOTIFY, INFO, HANDSHAKE
   CSeq: 1 INVITE
   Content-Length: 0
   Max-Forwards: 70

The identity service application can be configured to cause the mobile computing device to transmit, to the phone system of the caller, a request to execute an identity verification function, where the request includes the authentication token. For example, upon receipt of the 200 OK message indicating that caller phone system 120 supports the HANDSHAKE identity verification method, recipient device 110 can send caller phone system 120 a request to execute the HANDSHAKE method including the authentication token recipient device 110 received from CIS 125. An exemplary HANDSHAKE message is shown below, including the "authToken" field for the authentication token.

HANDSHAKE Message from Recipient Device 110 to Caller Phone System 120
   HANDSHAKE sip:receiver@ciservice.com SIP/2.0
   Via: SIP/2.0/UDP serv33.ciservice.com
   From: <sip:receiver ciservice.com>
   To: <sip:caller@corporate.com>
   Call-ID: a84b4c76e66710@serv33.ciservice.com CSeq: 2 HANDSHAKE
Content-Type: text/plain; charset=ISO-8859-4
Content-Length: 373
authToken:
AAAAB3NzaC1yc2EAAAADAQABAAABAQCl-
 KsfkNkuSevGj3eYhCe53pcjq
 P3maAhDFcvBS7O6Vhz2ItxCih+PnDSUaw+WNQn/
 mZphTk/a/gU8jEzoOWbk M4yxyb/
 wB96xbiFveSFJuOp/
 d6RJhJOI0iBXrlsLnBItntckiJ7FbtxJMXLvvwJryD
 UilBMTjYtwB+QhYXUMOzce5Pjz5/
 i8SeJtjnV3iAoG/cQk+OFzZqaeJAAHco+C
 Y/5WrUBkrHmFJr6HcXkvJdWPkYQS3xqC0+
 FmUZofz221CBt5IMucxXPkX4r
 Wi+z7wB3RbBQoQzd8v7yeb7OzlPnWOyN0q-
 FU0XA246RA8QFYiCNYwI3f0 5p6KLx Upon receipt of the HANDSHAKE method request, caller phone system 120 extracts the authentication token from the request and generates a result token by decrypting the authentication token with a key supplied by CIS 125. In some embodiments, the key is provided to caller phone system 120 in advance and is stored on caller phone system 120. In some embodiments, the key is provided to caller phone system at or around the time that CIS 125 sends the authentication token to recipient device 110.

After generating the result token, caller phone system 120 then sends recipient device 110 a response to the HANDSHAKE request in the form of a SIP 200 OK message including the result token it generated based on the encrypted authentication token.

HANDSHAKE Response from Caller Phone System 120 to Recipient Device 110
SIP/2.0 200 OK
Via: SIP/2.0/UDP serv33.miservice.com
From: <sip:caller@corporate.com>
To: <sip:receiver ciservice.com>
Call-ID: a84b4c76e66710@serv33.ciservice.com
CSeq: 2 HANDSHAKE
Content-Type: text/plain; charset=ISO-8859-4
Content-Length: 34
result Token: 4rf94nr3984rn3iruj39rn43u93r439ur3

Recipient device 110 receives the HANDSHAKE response and extracts the result token generated by caller phone system 120 for validation against a result token that recipient device 110 generates using a stored key it has received from CIS 125. If the result tokens match, the "trust handshake" has been established and the identity of caller 115 is considered authenticated. Recipient 105 can then decide whether or not to accept the call as described above.

In some embodiments, in lieu of sending a result token back to recipient device 110 for verification against the result token it has generated, both devices instead generate a random number (e.g., sequence of alphanumeric characters) based on the respective result token they have generated, and display the random number on their respective device display. Recipient 105 can then prompt caller 115 to recite the random number displayed on the screen of caller phone system 120 to verify against the number displayed on recipient device 110. If the random numbers match, the identity of caller 115 is considered authenticated and recipient 105 can proceed with the call.

In some embodiments, data and statistics (e.g., name, ID and location of caller 115, time call received, duration of call, etc.) about the authentication process are captured and forwarded to CIS 125 for integration into a call authentication history log. In some embodiments, the required steps to authenticate a caller can be reduced if there is a history of successful caller identity authentication.

Although SIP has been used as an illustrative protocol for the methods described herein, a person of ordinary skill in the art will appreciate that other communication protocols can be used without departing from the spirit of the described technology.

In another variation to method 200, caller phone system 120 includes an Internet-connected client computing device such as a laptop or desktop computer, and a non-Internet enabled phone. In this embodiment, during step 205, the client computing device of caller 115 contemporaneously initiates communication with CIS 125 upon initiating the incoming call setup request. For example, the client computing device forwards a message to CIS 125 indicating that caller 115 will be calling recipient 105. In this embodiment, due to caller 115 using a non-Internet-enabled phone, the caller identifier extracted by recipient device 110 can be based on information such as caller ID and/or ANI. Upon receipt of the caller identifier information from recipient device 110, CIS 125 generates and cryptographically signs an authentication token as described in connections with steps 220 and 225 above. However, in this example, CIS 125 forwards the token to recipient device 110 and the client computing device of caller 115. The token is then decrypted by both recipient device 110 and the client computing device of caller 115, and should produce identical result tokens. In some embodiments, the identity service application executing on recipient device 110 prompts (e.g., verbally, visually) recipient 105 to ask caller 115 to verbally read back the result token generated by the client computing device to verify that it matches the result token displayed on recipient device 110. In some embodiments, recipient device 110 and the client computing device of caller 115 each generate a random number based on their respective result token, and the value of the random number is verified, as described above.

FIG. 3 shows a flow diagram of a method 300 for authenticating the identity of a caller using a caller identity and authentication service. In the exemplary embodiment shown in FIG. 3, the caller (e.g., caller 115) is a registered subscriber to CIS 125, and the call recipient (e.g., recipient 105) may or may not be a registered subscriber. Further, in this embodiment, only the caller phone system (e.g., caller phone system 120) used by caller 115 has the ability to both make and receive calls, and to connect to CIS 125 via communications network 135. Recipient device 110 is a non-Internet enabled phone. In some embodiments, recipient device 110 is a dual-tone multi-frequency signaling ("DTMF") phone terminal.

According to method 300, a phone terminal (e.g., recipient device 110) establishes (305) a first call in response to an incoming call setup request initiated by a phone system (e.g., caller phone system 120) of a caller (e.g., caller 115) registered with an identity service (e.g., CIS 125). For example, caller 115 can cause caller phone system 120 to initiate a call to recipient device 110.

The phone terminal extracts (310) caller identifier data from a signal of the first call. The caller identifier data corresponds to a phone number of the caller. In this embodiment, due to recipient 105 using a non-Internet-enabled phone terminal, the caller identifier extracted by recipient device 110 can be based on information such as caller ID and/or ANI.

The phone terminal initiates (315) a second call to the identity service. For example, recipient device 110 can effect a hook flash event upon extracting the caller identifier data to access a second phone line. In some embodiments, the second phone line is preconfigured to dial the number of a phone connection of CIS 125.

The phone terminal provides (320) the caller identifier data to an identity service computing device of the identity service. For example, recipient device 110 can communicate the caller identified data to CIS 125 using a series of DTMF signals/tones.

The phone terminal receives (325), via the second call, one or more dual-tone multi-frequency signaling tones indicating an identity status of the caller. For example, CIS 125 can communicate the identity status of caller 115 using a series of DTMF signals/tones. In some embodiments, the DTMF signaling tones sent by CIS 125 include a first set of tones indicating the caller is registered with the identity service or a second set of tones indicating the identity of the caller is unverified. In some embodiments, recipient device 110 can include a text display for displaying a message to recipient 105 based on whether the DTMF tones indicate that caller 115 is verified.

FIG. 4 shows a flow diagram of a method 400 for authenticating the identity of a caller using a caller identity and authentication service. In the exemplary embodiment shown in FIG. 4, the caller (e.g., caller 115) is a registered subscriber to CIS 125, and the call recipient (e.g., recipient 105) may or may not be a registered subscriber. Further, in this embodiment, the caller phone system (e.g., caller phone system 120) used by caller 115 and recipient device 110 are non-Internet enabled phones. In some embodiments, caller phone system 120 and recipient device 110 are dual-tone multi-frequency signaling ("DTMF") phone terminals.

According to method 400, a phone terminal establishes a first call in response to an incoming call setup request initiated by a phone system of a caller registered with an identity service, and the phone system of the caller contemporaneously provides caller identifier data corresponding to the phone terminal to an identity service computing device of the identity service via a second call established by the phone system of the caller. For example, a call is established when caller 115 places a call to recipient device 110 using caller phone system 120.

In some embodiments, caller phone system 120 includes a second phone line which it uses to establish a call to CIS 125 at or around the time the call to recipient device 110 is established. In some embodiments, caller 115 calls CIS 125 prior to calling recipient device 110. In some embodiments, caller phone system 120 uses a hook flash event to switch to a second phone line and establish a call to CIS 125 after a call to recipient device 110 has been established.

Upon contacting CIS 125, caller phone system 120 provides certain information to CIS 125 using a series of DTMF tones. For example, caller phone system can indicate that it has established, or is intending to establish, a call with recipient device 110. In some embodiments, caller phone system 120 provides information related to caller 115 and/or the business entity that employs caller 115.

The phone terminal initiates (410) a third call to the identity service. For example, recipient device 110 effects a hook flash event to access a second phone line upon extracting caller identifier data from its call connection with caller phone system 120. In some embodiments, the second phone line is preconfigured to dial the number of a phone connection of CIS 125. Recipient device 105 provides the caller identifier data to an identity service computing device of CIS 125. For example, recipient device 110 can communicate the caller identifier data to CIS 125 using a series of DTMF signals/tones.

The phone terminal receives (415), via the third call, one or more dual-tone multi-frequency signaling tones indicating an identity status of the caller. For example, CIS 125 can communicate the identity status of caller 115 using a series of DTMF signals/tones. In some embodiments, the DTMF signaling tones sent by CIS 125 include a first set of tones indicating the caller is registered with the identity service or a second set of tones indicating the identity of the caller is unverified. In some embodiments, recipient device 110 can include a text display for displaying a message to recipient 105 based on whether the DTMF tones indicate that caller 115 is verified.

Accordingly, as illustrated by reference to the exemplary embodiments, the technology described herein provides a simpler, more automated, and more robust method of authenticating the identity a calling party over existing technologies.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A computerized method for authenticating the identity of a caller, the method comprising:

receiving, by a mobile computing device, via a wireless communications network, an incoming call setup request initiated by a phone system of a caller; and executing, by the mobile computing device, an identity service application upon receipt of the incoming call setup request, the call comprising a plurality of data packets, wherein the identity service application is configured to cause the mobile computing device to:

extract a caller identifier from the plurality of data packets, the caller identifier comprising one or more bits at a first predetermined position within the plurality of data packets;

forward the caller identifier to an identity service computing device via a data communications network, the identity service computing device configured to determine an identity status of the caller;

receive, from the identity service computing device, via the data communications network, an authentication token and the identity status of the caller;

inserting one or more bits at a second predetermined position within the plurality of data packets of the call with the authentication token upon acceptance of the incoming call setup request by a user of the mobile computing device;

display, on the display device of the mobile computing device a first key generated based on the authentication token, the first key comprising a plurality of alphanumeric characters;

prompt the user of the mobile computing device to request the caller to verify a second key displayed on a display device of the phone system of the caller, the second key generated based on the authentication token extracted by the phone system of the caller from the second predetermined position within the plurality of data packets of the call; and display, on a display device of the mobile computing device, the identity status of the caller.

2. The computerized method of claim 1 wherein the identity service application is further configured to cause the mobile computing device to:

transmit, to the phone system of the caller, a request to execute an identity verification function, the request comprising the authentication token;

receive, from the phone system of the caller, a result token generated by the phone system of the caller based on the authentication token; and validate the result token against a key generated based on the authentication token.

3. The computerized method of claim 2 wherein the call is conducted using the Session Initiation Protocol signaling protocol.

4. The computerized method of claim 3 wherein the identity verification function is a method for extending the Session Initiation Protocol.

5. The computerized method of claim 1 wherein the identity service computing device determines the identity status of the caller based on one or more of:
(i) a subscription of the caller to an identity service associated with the identity service computing device, and
(ii) public data associated with the caller comprising a caller name, at least one statistic indicating a verification status of the caller, and a public sentiment rating.

6. The computerized method of claim 5 wherein public sentiment rating is based on a plurality of votes by users who have received an incoming call from the caller.

7. The computerized method of claim 1 wherein the wireless communications network is one of a GSM, CDMA, TDMA, iDEN, or AMPS network.

8. The computerized method of claim 1 wherein data communications network is a different network than the wireless communications network.

9. The computerized method of claim 1 wherein a client computing device of the caller contemporaneously initiates communication with the identity service computing device upon initiating the incoming call setup request.

10. The computerized method of claim 9 wherein the identity service application is further configured to cause the mobile computing device to:
substitute one or more bits at a second predetermined position within the plurality of data packets of the call with the authentication token upon acceptance of the incoming call setup request by a user of the mobile computing device;
display, on the display device of the mobile computing device a first key generated based on the authentication token, the first key comprising a plurality of alphanumeric characters; and
prompt the user of the mobile computing device to request the caller to verify a second key displayed on a display device of the phone system of a caller, the second key generated based on the authentication token extracted by the phone system of the caller from the second predetermined position within the plurality of data packets of the call.

11. The computerized method of claim 9 wherein the identity service application is further configured to cause the mobile computing device to:
display, on the display device of the mobile computing device, a first key generated based on the authentication token upon acceptance of the incoming call setup request by a user of the mobile computing device, the first key comprising a plurality of alphanumeric characters; and
prompt the user of the mobile computing device to request the caller to verify a second key displayed on a display device of the client computing device of the caller, the second key generated based on the authentication token sent to the client computing device of the caller from the identity service computing device.

12. The computerized method of claim 9 wherein the identity service computing device determines the identity status of the caller based on one or more of:
(i) a subscription of the caller to an identity service associated with the identity service computing device, and
(ii) public data associated with the caller comprising a caller name, at least one statistic indicating a verification status of the caller, and a public sentiment rating.

13. The computerized method of claim 12 wherein public sentiment rating is based on a plurality of votes by users who have received an incoming call from the caller.

14. The computerized method of claim 9 wherein the wireless communications network is one of a GSM, CDMA, TDMA, iDEN, or AMPS network.

15. The computerized method of claim 9 wherein the data communications network is a different network than the wireless communications network.

* * * * *